INVENTOR
KENNETH R. RAND
BY Bradley Cohn
ATTORNEY

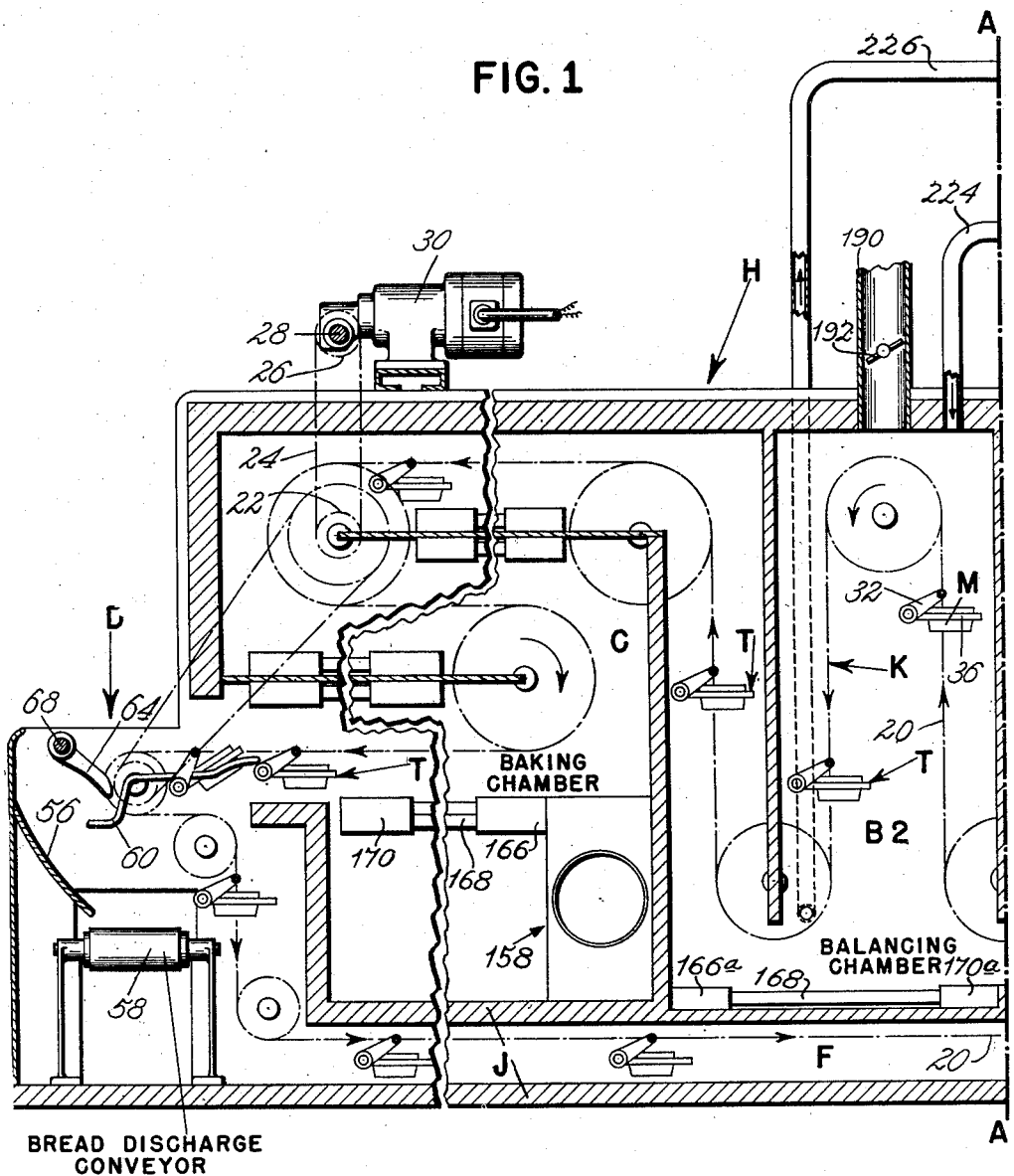

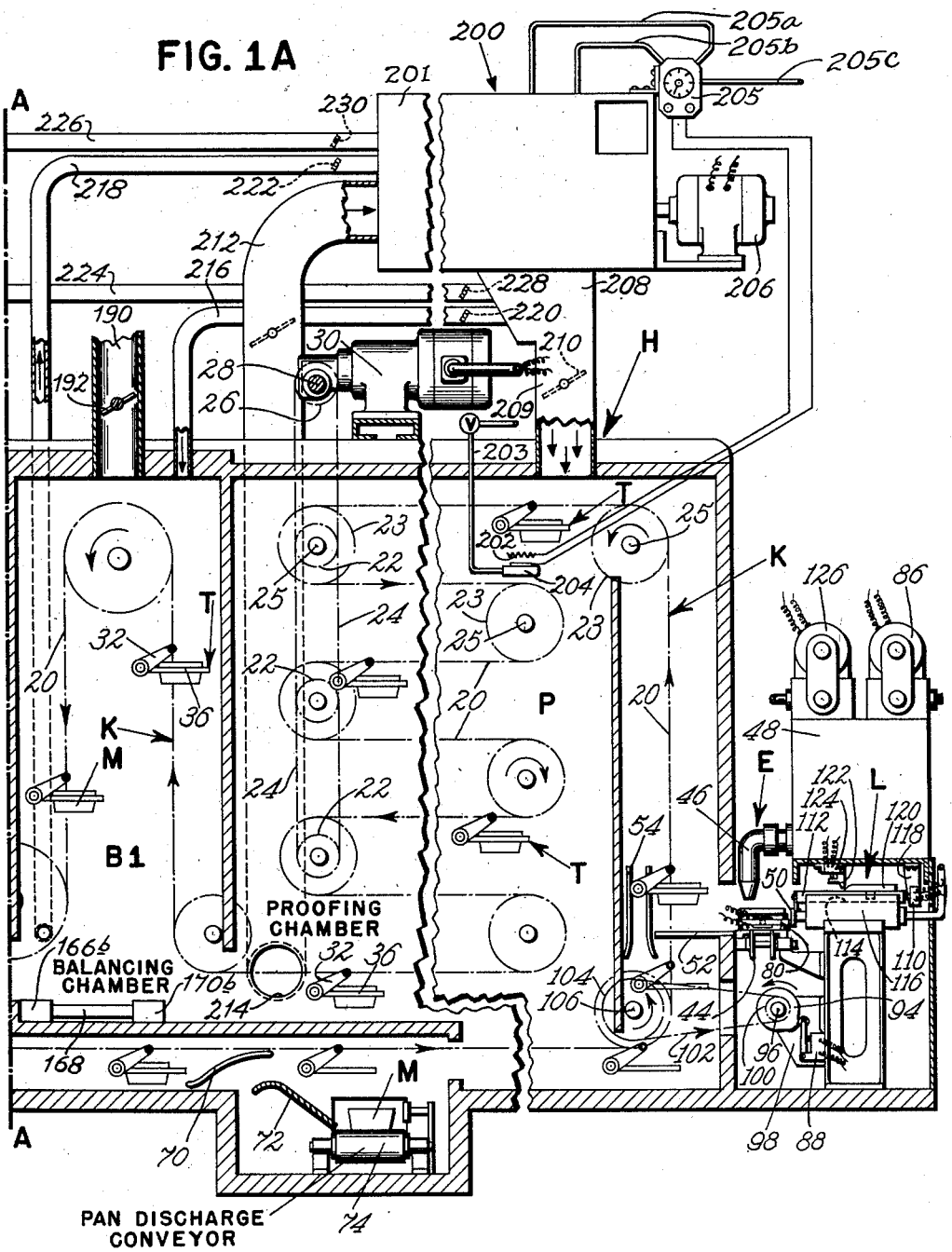

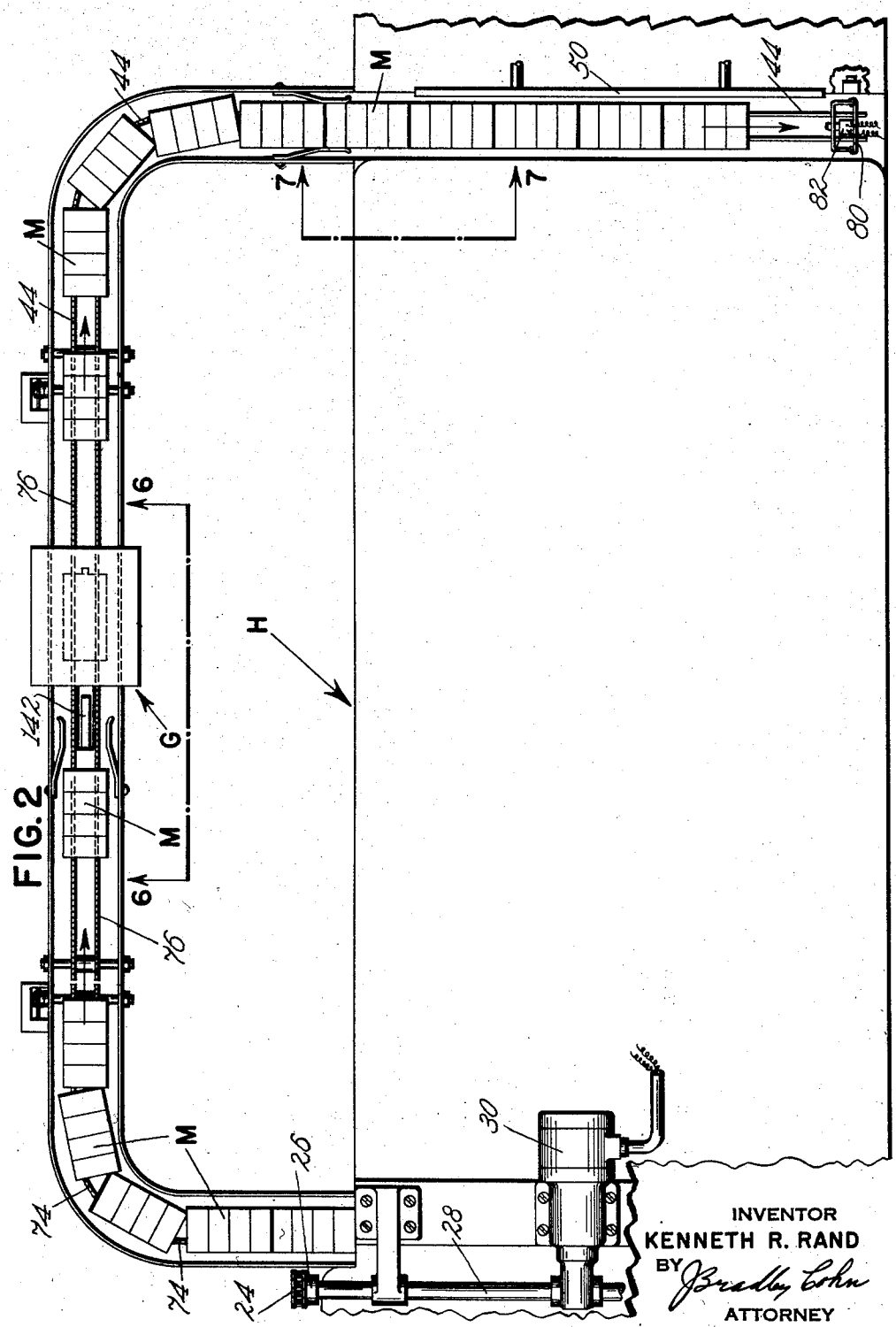

Feb. 5, 1957 K. R. RAND 2,780,182
AUTOMATIC BREAD PLANT
Filed Oct. 16, 1952 6 Sheets-Sheet 5
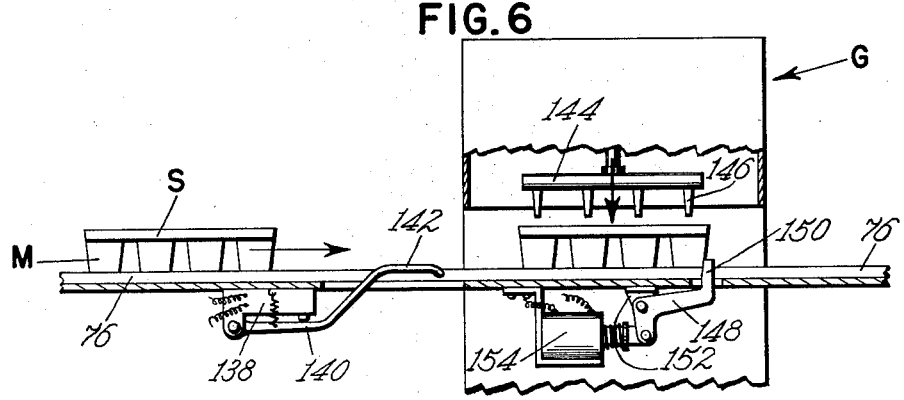
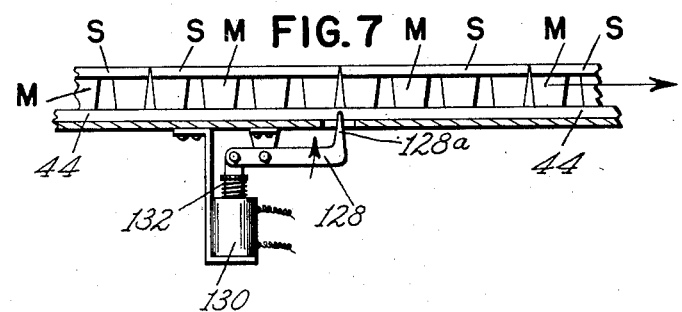
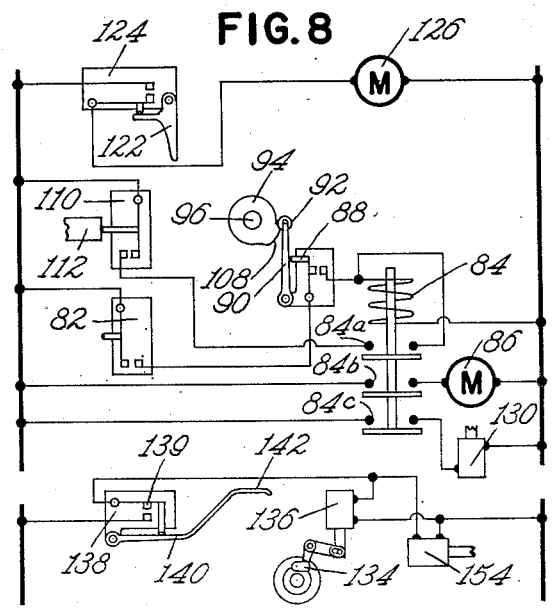
INVENTOR
KENNETH R. RAND
BY
ATTORNEY Feb. 5, 1957 K. R. RAND 2,780,182
AUTOMATIC BREAD PLANT
Filed Oct. 16, 1952 6 Sheets-Sheet 6
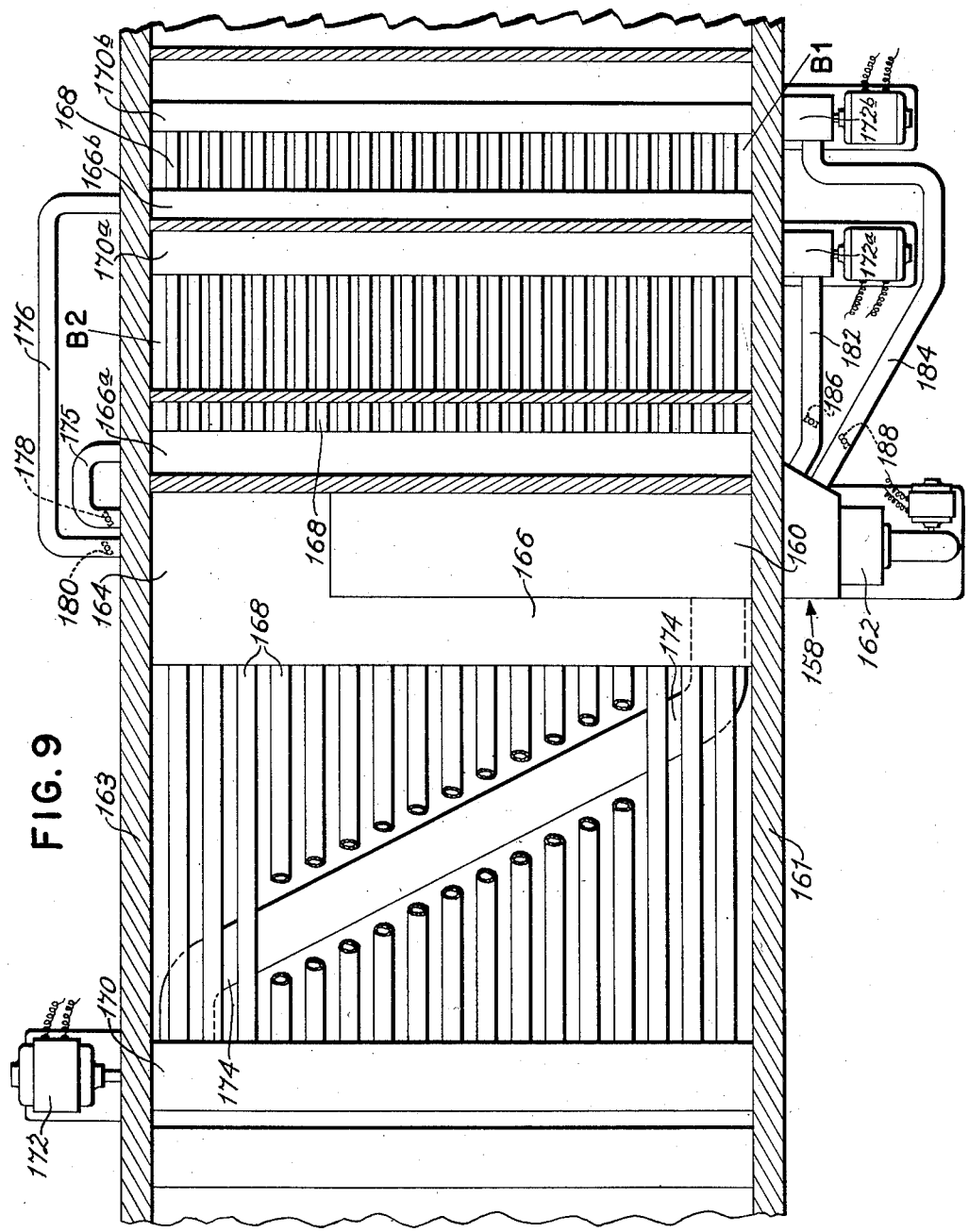
INVENTOR
KENNETH R. RAND
BY Bradley Cohn
ATTORNEY

United States Patent Office 2,780,182
Patented Feb. 5, 1957

2,780,182
AUTOMATIC BREAD PLANT

Kenneth R. Rand, Branford, Conn., assignor to American Machine & Foundry Company, a corporation of New Jersey Application October 16, 1952, Serial No. 314,992

23 Claims. (Cl. 107—4)

This invention relates to the continuous and automatic proofing and baking of bread doughs. It has for its object a means adaptable for continuous and uninterrupted conveyance of bread dough through a final proofer and oven.

It is a further object of the invention to provide automatic means for continuously moving bread pans through a proofer chamber and a baking chamber, a depanner, a pan cooler and pan greaser.

A further object of this invention is a composite unit whereby bread dough may be continuously deposited in pans continuously moving through proofing and baking chambers, thereby eliminating handling as well as floor time between the several operations.

One of the objects of my invention is to permit the construction of a composite proofing and baking unit that will be adaptable to the particular requirements and formulae of a commercial baker in that the system may be varied as desired with regard to the ratio of proofing to baking time. Heretofore, commercial bakeries have employed separate units for each of the several operations performed in my composite unit, viz., panning, proofing, baking, depanning, pan cooling and pan greasing. While these units are frequently strategically placed with reference to each other, and while frequently measures are taken to coordinate these separate units in an effort to save time and space, this has not yet been done in a manner approaching mine in simplicity of design and manufacture. Timing and synchronizing means have been expensive, involved, and generally unsatisfactory.

One of the main obstacles to designing a continuous unit has been the inability to make flexible the time ratio between pan proofing and baking. Another difficulty is timing all the enumerated operations. I have solved this last by a simple and efficient timing device located adjacent the loading station. The proofing and baking time ratio is made flexible by my novel balancing chambers. These and other advantages will become apparent to those familiar with the art from the specifications of the embodiment of my invention herein disclosed.

In accomplishing the purposes of my invention I have devised novel balancing chambers located between the proofer and baking chambers. Each balancing chamber, according to my invention, may be utilized selectively as baking chamber, proofing chamber or neutral chamber wherein the dough is neither proofed nor baked.

I have further designed a novel depanning means whereby the baked bread may be automatically and conveniently removed from the pans and the pans permitted to remain in the continuous cycle. This depanning means is particularly designed for my composite unit.

It is a further object of my invention to design an integrated proofing and baking unit for self-contained continuously moving pans to the end that both labor and floor space are greatly reduced. Floor racks and the loading thereof, are eliminated between the several operations performed in my composite unit.

It is a further object of my invention to provide a continuous depositing means for depositing the dough into the pans of my self-contained continuous unit.

It is likewise an object to devise means for combining all the operations in a manner adaptable to a single self-contained unit.

Since in a commercial application of my invention the dough conveying means must necessarily be of great length, it is an object of my invention to devise a system that requires indexing at only a single station, viz., the loading station. I have, thereby, eliminated the problems presented by expansion and contraction resulting from heat and wear. That is, such changes in the length of the conveying means will not adversely affect the timing of my novel combination means.

It is a further object of my invention to devise a self-contained unit from which the pans need not be removed thereby conserving floor space. Moreover, my invention is, at the same time, adaptable to a quick change from one pan size to another.

My invention is a unitary dough depositor, final proofer, oven, depanner, pan cooler, and pan greaser.

In the accompanying drawings:

Figs. 1 and 1A when joined at line A—A show a sectional side elevation of the automatic bread plant;

Fig. 2 is a partial plan view of the same illustrating the return of empty pans through a greasing station to the loading station;

Fig. 6 is a sectional side elevation of the pan control mechanism at the greasing station;

Fig. 7 is a partial side elevation of the pan control mechanism at the loading station;

Fig. 8 is a wiring diagram of the electrical control circuits of the automatic bread plant; and Fig. 9 is a sectional plan view diagrammatically illustrating the heating system for baking in the oven and balancing chambers.

Figure 3:
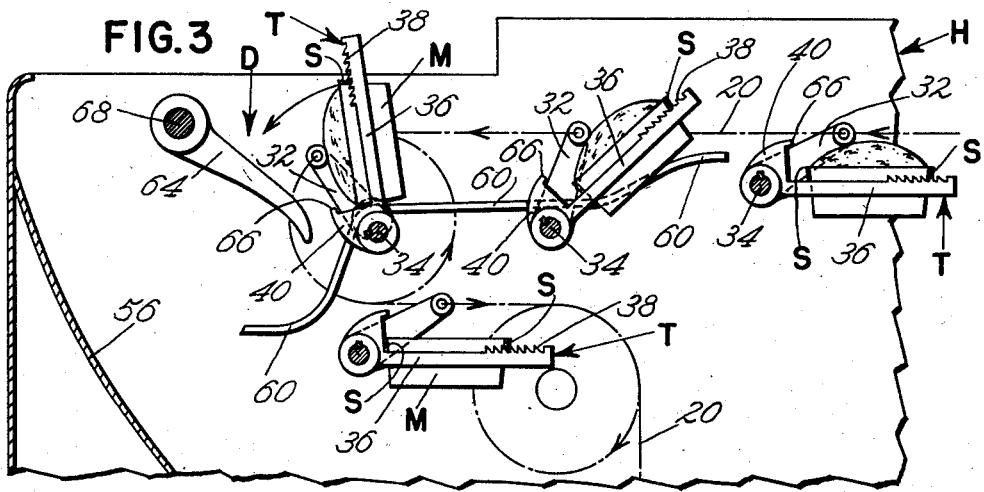
Fig. 3 is a partial side elevation of the depanning station.

With reference to the drawings (Figs. 1, 1A and 9), the automatic bread plant consists of a combined panner E, loader L, proofer P, balancing chambers B1 and B2, oven C, depanner D, pan cooler F and pan greaser G. The plant housing H contains the proofing chamber P, the baking chamber C and the intermediate balancing chambers B1 and B2. Each of these balancing chambers is designed to serve selectively as proof chamber or baking chamber or neutral chamber. That is, the temperature and humidity therein may be selectively controlled, as hereinafter described, within any of the three ranges, so that proofing time may be relatively increased or decreased with reference to the baking time. The transit time in each of the four chambers is necessarily constant with relation to each other.

It is these balancing chambers B1 and B2 that permit variation in the time ratio between proofing and baking. Either or both of chambers B1 and B2 may be held at lower than proofing temperature so that substantially no proofing would occur during the dough's passage therethrough.

Within the housing H a single continuously moving conveyor K runs through proofing chamber P, balancing chambers B1 and B2 and baking chamber C to return through pan cooling chamber F. Conveyor K makes several passes through each chamber on suitably mounted pulleys 23, as clearly shown in Figs. 1 and 1A. Its relative transit time in any one chamber with relation to any other chamber is fixed.

The conveyor K consists of a pair of endless chains 20 (Fig. 5) arranged parallel to each other and led over a plurality of pulleys 23 (Figs. 1 and 1A) mounted on stud shafts 25 suitably journaled in bearings attached to the inner side walls of the housing H. Due to their extreme lengths, chains 20 are driven at more than one point by means of sprockets 22 mounted on several of the shafts 25. The sprockets 22 in chambers P and C are driven by chains 24 from sprockets 26 mounted on a pair of horizontal transverse shafts 28 in turn driven by two synchronized reduction gear motors 30 secured to the top of the housing H.

Figure 4:
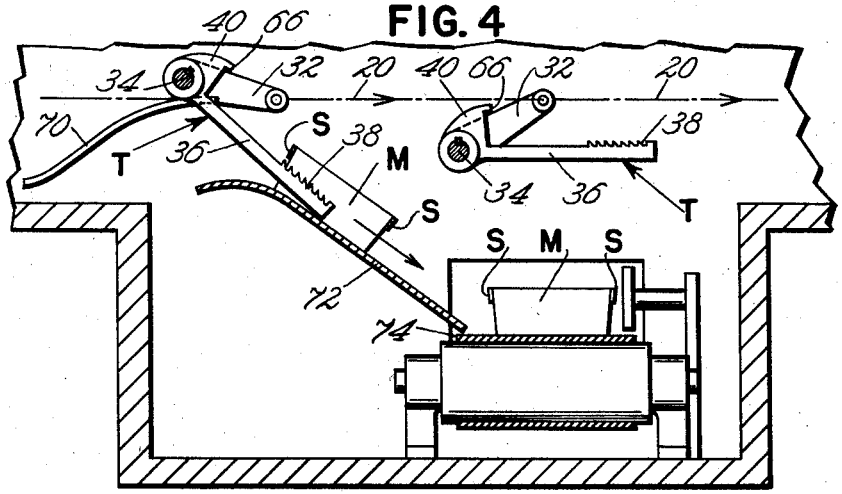
Fig. 4 is a sectional side elevation of the pan discharge station.
Figure 5:
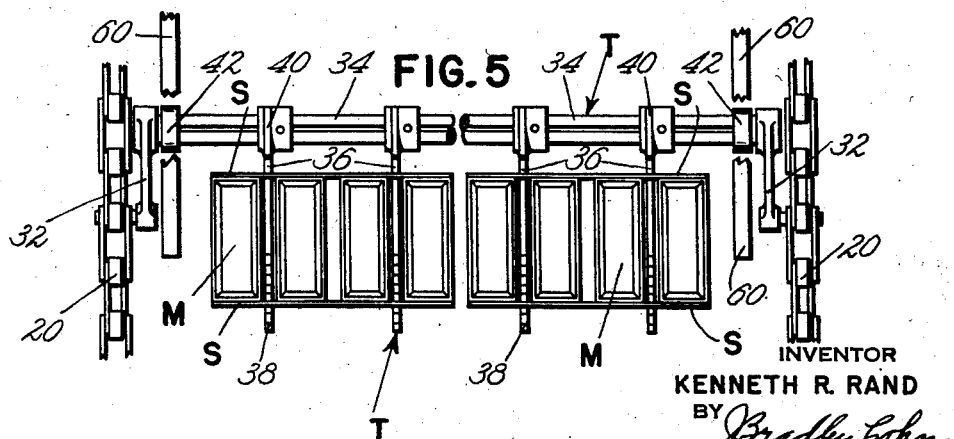
Fig. 5 is a plan view of one of the pan carrying trays at the depanning station within the oven.

The pan supporting trays T are formed of a plurality of evenly spaced and oppositely paired arms 32 pivotally secured to chains 20. Each pair of arms 32 supports a horizontal rod or shaft 34 secured to the freely hanging hub of the arms 32. A plurality of properly spaced tray carrying members 36 are slidably keyed on each horizontal rod 34. The free end of each member 36 is provided with teeth 38 (Figs. 3, 4, and 5). The hub of each member 36 has a projection or lug 40. Cam followers or guide discs 42 (Fig. 5) are secured to rod 34 at a point adjacent the hub of each arm 32. As hereinafter described, the lug 40 serves to grip the bread pans M during the depanning operation.

A predetermined number of pans M (groups of four are shown) are connected by a strap S. The empty "straps" of pans M arrive at the loading station L by means of a belt conveyor 44. Here they are filled by automatically controlled nozzles 46 of a suitable dough extruding device 48 driven by a motor 126 whose power is controlled by a cam-operated switch 124 whose operation is hereinafter described. The dough extruding device 48 may be of the type shown in patent to Costigan 1,348,269, dated August 3, 1920. A predetermined number of filled pan straps are pushed by means of a plunger 50 of the loading device L from the conveyor 44 onto a slotted platform 52 in the path of the carrier conveyor K where each strap of pans is engaged by a pair of carrier members 36 of trays T on said continuously moving conveyor K.

As the members 36 of trays T engage the filled straps of pans M on the platform 52, the cam follower or guide discs 42 engage a pair of vertical cam tracks 54 (Fig. 1A). The filled straps of pans M are then carried on trays T by conveyor K through the proofing chamber P, the two balancing chambers B1 and B2 and the baking chamber C (Figs. 1 and 1A) to the depanner station D where the baked loaves of bread are dumped from the pans into a suitable chute 56 (Fig. 1) leading to continuously running delivery conveyor 58.

Assuming that for a given constant speed of conveyor K, any tray T will pass through the proofing chamber P in $60t$ (where $t$ is a constant unit of time, as for example, one minute) and each balancing chamber B1 and B2 in $3t$, and the baking chamber in $25t$, it is apparent that the following ratios of proofing to baking time are readily obtainable: 60:25; 63:25; 66:25; 60:28; 63:28 and 60:31. There is thus approximately a 36% variation in proof:bake ratio. (66:25 divided by 60:31 equals 1.364 or an increment of 36.4%.) In addition, by varying the speed of the conveyor, the absolute transit time can be changed without disturbing the operation of the system or its relative timing. Hence the baker can quickly and easily compensate for dough variations within broad limits. For example, the conveyor K could be speeded up 12% to reduce the bake chamber time to $22t$, and still maintain the proof at $60t$, if desired. Thus, by varying the balancing chambers and by slightly varying the speed, a range of $22t$ to $31t$ for bake is possible without substantial change in proof time.

The depanning of the baked loaves from the pans M at the depanner station D is accomplished by means of a pair of stationary cam tracks 60 (Figs. 1 and 3) with which the guide discs 42 of trays T engage. Cam tracks 60 are designed and arranged to gradually swing the pan carrying members 36 of trays T upward. This causes the pans M to slide towards the hubs of members 36 and engage with the lugs 40 thereof. The tilting of members 36 continues beyond the vertical until the pan straps fall forward in the direction of the arrow (Fig. 3) so the upper edges of the pan strap S strikes the top edges of spaced depanner arms 64 secured to stationary cross rod 68. The baked loaves are jarred from their respective pans to drop between arms 64 into chute 56. During this motion the lower edges of pan straps S engage with and are held by a projection 66 provided on the upper free end of each lug 40. The angular position and shape of depanner arms 64 is such that they now co-act with the tail end of the cams 60 to bring the now empty straps of pans M back to right side up rest position on their respective carrier arms 36 again while these latter, by means of cams 60, are gradually guided back to horizontal position.

The empty straps of pans M are then carried downward and through the pan cooler F which consists of a horizontal tunnel J located in the bottom portion of the housing H. At the end of tunnel J, another pair of stationary cam tracks 70 (Figs. 1A and 4) engage and raise guide discs 42 of trays T and thereby swing carrier arms 36 downward discharging the straps of pans M on plate 72. The angle of the plate 72 is steep enough to permit the pans M to slide down to a pan conveyor 74. When the guide discs 42 disengage from the cam tracks 70 the empty pans M are well out of the path of the carrier arms 36 which then assume their normal horizontal position again and move with the conveyor to the loading station for the next cycle.

The pan conveyor 74 which carries the empty pans M out of the housing H may be of any suitable type known in the art. From conveyor 74, the straps of pans M move onto a speed-up conveyor 76 which passes them through an automatic pan greaser G (Fig. 2) also of conventional and well known construction. The greased strap of pans M is delivered to the infeed conveyor 44 leading to the loading station L. At station L the pans are re-filled from nozzles 46 and moved by pusher 50 to platform 52 as will be more fully described.

In order to properly co-ordinate and synchronize the various mechanisms to assure a continuous and uninterrupted operation of the automatic bread plant, an automatic electrically operated control system diagrammatically illustrated in Fig. 8 is provided. This control starts with a normally open micro switch 82 mounted on a bracket 80 at the end of infeed conveyor 44. The leading end of the first strap of pans M arriving at the loading station depresses and closes micro switch 82. The closing of micro switch 82 energizes control relay 84 provided cam controlled which 88 is in closed position. This closes relay contacts 84a, 84b and 84c.

When contact 84b closes, power is applied to a motor 86 which produces hydraulic pressure to operate a hydraulic plunger 50 (Fig. 2) of the loading mechanism L to push the row of pans from the forward end of the infeed conveyor to slotted platform 52. However, since the pans M must arrive on platform 52 in proper time relation with the continuously moving tray conveyor K the micro switch 82 is connected in series with normally open control switch 88 which is actuated through a cam lever 90 having a cam roller 92 engaging a cam 94 mounted on a shaft 96 supported by a suitable bearing bracket 98. Shaft 96 carries a sprocket 100 (Fig. 1A) driven through a chain 102 from sprocket 104 mounted on one of the revolving stud shafts of the continuously moving tray conveyor K. High spot 108 of cam 94, therefore, closes switch 88 at the proper time intervals for pans M to be pushed onto platform 52. Since plunger 50 starts its motion only when both switches 82 and 88 are closed, it will move only when there is a full supply of pans in front of it (which closes switch 82) and when a tray T on conveyor K is approaching platform 52 (closing switch 88).

As plunger 50 moves forward and pushes a row of a predetermined number of pans M from the infeed conveyor 44 onto the slotted platform 52, and the leading pan M loses contact with micro switch 82, the relay 84 is kept energized by means of a normally open hold-in switch 110 which closes as control bar 112 (Fig. 1A) attached to plunger 50 moves forward or away from it. Control bar 112 is guided in a longitudinal groove 114 on top of the plunger rod housing 116. Hold-in switch 110 is mounted in a bracket 118 attached to the framework of dough extruding device 48.

To the top surface of the control bar 112 is interchangeably secured a cam piece 120 which, as the plunger moves forward, contacts and depresses a pivotally mounted switch activating arm 122 which closes a switch 124 to apply power to motor 126 of dough extruding device 48. Dough is then deposited through the nozzles 46 into the empty pans M as they move forward to platform 52. The depositor motor 126 is inactivated when arm 122 drops off the end of cam piece 120 moving beneath and forward with the plunger 50. This stops the deposit of dough into the pans M. By changing the length of the cam piece 120, the extruding may be decreased or increased, as desired, in accordance with the size of the pans M.

The plunger 50 continues its forward motion until the pans have reached platform 52 and then returns to its back or starting position. During the backward motion of the plunger 50, the cam piece 120 lifts the pivoted switch operating arm in the opposite direction with no effect on the extruder control switch 124. In order to prevent a new row of empty pans from moving into the loading station before the plunger 50 has returned from pushing the preceding row, a solenoid operated pan arresting lever 128 (Fig. 7) is moved in the path of the new row of pans as soon as the control relay 84 is energized. The closing of contacts 84c causes solenoid 130 to be energized. The armature of solenoid 130 is pivotally connected to one end of the pan arresting lever 128 and moves the free hook-shaped end 128a into the path of the succeeding pans M. When plunger 50 returns to its backmost position, relay 84 is de-energized (by the opening of hold-in switch 110) and end 128a of lever 128 with the aid of spring 132 (Fig. 7) around the armature of solenoid 130 is withdrawn from the path of the pan to permit them to advance to the loading station L until the leading pan contacts switch 82.

As mentioned before, the pans M emerge from the pan cooler F on conveyor 74 to speed-up conveyor 76 which runs through the greaser G. Conveyor 76 is speeded up to space the pans for the greaser G (Fig. 2) since they arrive in closely following formation on conveyor 74. The greasing at G may be accomplished by any of the well known automatic pan greasers through which conveyor 76 may be led.

Greaser G is operated through a conventional one-revolution clutch 134 (Fig. 8) tripped by a soleniod 136 energized through a normally open switch 138. Switch 138 is closed when the free end 142 of a lever 140 is depressed by an empty strap of pans moving on conveyor 76 towards the greaser G (Fig. 6). The greaser G itself may be provided with an upwardly and downwardly oscillating hollow arm 144 carrying a plurality of suitable nozzles 146.

The greasing station is further provided with a pan arresting lever 148 having a free end 150 normally extending into the path of the pans arriving on conveyor 76 (Fig. 6). Lever 148 is pivoted to a supporting bracket 152 and operatively connected to the armature of a solenoid 154 hooked up in series with switch 138 (Fig. 8). Solenoid 154 is normally de-energized with arresting lever 148 in the path of the pans. When switch 138 is closed by the succeeding strap of pans M, the lever 148 is withdrawn to permit the greased strap of pans to proceed onto the infeed conveyor 44. The tripping of lever 140 and the closing of contacts 139 of switch 138 also energizes the solenoid 136. The solenoid 136, when energized, engages the one revolution clutch 134. The drive shaft of the greaser G is driven from the clutch 134. The action is such that solenoid 136 is energized, the one revolution clutch is engaged and the greasing mechanism is set in motion so that arm 144 with nozzles 146 are entering the pans as they arrive at the greasing station. After the pans have passed over the arm 140 solenoid 154, of course, is de-energized again, so that the end 150 of the arresting lever 148 is again in the path of oncoming pans to arrest them for the greasing operation until released by the following strap of pans contacting arm 140. Conveyors 76 and 44, of course, run continuously to move the pans through the conveyor and to the loading station.

*Baking system*

With reference to Figs. 1, 1A and 9, the heating system 158 for baking, which is of the re-circulating type, shown in Patent 2,556,840, dated June 12, 1951, is positioned in the baking chamber and may include a combustion chamber 160. A burner 162 of conventional construction is mounted outside of the side wall 161 of housing H of the baking chamber and is supplied with air and a suitable fuel which are delivered to the interior of the combustion chamber 160 wherein the fuel is burned. The hot combustion gases issuing from the combustion chamber 160 pass through duct 164 into the intake header 166 of the radiator of the heating system. The intake header 166 is connected to one end of a series of flues or pipes 168 whose other end communicates with the exhaust header 170. The hot combustion gases therefore flow through the intake header 166 and flues 168 into exhaust or return header 170.

A return fan driven by motor 172 returns the gases to the chamber 160 by means of diagonal conduit 174. There are located in each of the balancing chambers intake headers 166a (166b) and exhaust headers 170a (170b). The intake header 166a is connected to the duct 164 by the pipe 175 while the intake header 166b is connected to the duct 164 by the pipe 176.

There are located, respectively, in each of the pipes 175, 176 damper control valves 178 and 180 whereby the combustion gases from the duct 164 may be selectively admitted as desired to either or both of the intake headers 166a and 166b. The intake and exhaust headers in all cases are connected by flues or pipes 168. On each of the exhaust headers in the balancing chambers there are located return fans 172a, 172b which return the gases to the heater 158 by means of the pipes 182, 184 having damper control valves 186, 188, respectively.

With reference to Fig. 9, it can thus be clearly seen that the balancing chambers B1, B2 may be heated along with the baking chamber to baking temperature, as desired. Each balancing chamber is provided with a vent pipe 190 having a damper control valve 192. When the damper 192 is open, the temperature in the balancing chamber may be quickly reduced down toward room temperature.

*Proofing system*

With reference to Figs. 1A and 1, there is positioned over the proofing chamber a temperature and humidity control box 200. This is of conventional construction and is designed to control the temperature and humidity of air for proofing conditions. Within the proofing chamber is located a thermostat 202 and a wet and dry bulb controller 204. The wick of the wet and dry bulb controller 204 is supplied by a water pipe 203 leading from a water supply valve V. The thermostat and the wet and dry bulb controller are wired to a dial control indicator 205 suitably connected to the control box 200. Control 205 and control box 200 may be any temperature humidity control unit. These units usually utilize steam or water spray for humidity control and steam or hot water radiation for temperature control. For example, the tube 205c may bring in steam or hot water. This steam or hot water will be conveyed selectively by the control 205, in response to variations in temperature and humidity in the proofing chamber P, to control box 200 by the tubes 205a and 205b. Tube 205a leads to atomizer nozzles (not shown) in box 200 for the purpose of introducing moisture into the box 200 to increase humidity. Tube 205b, on the other hand, runs to a heat exchanger (not shown) in box 200 for the purpose of introducing heat.

The fan driven by the motor 206 draws air for recirculation and re-conditioning into its manifold end portion 201 and blows the warmed and humidified air from the control box 200 into the top of the proofing chamber through the chamber 208 and the duct 209. The duct 209 has located therein control damper 210. The air is returned through the duct 212 communicating with the proofing chamber near its bottom by means of the port 214 in wall 163 of housing H.

Leading from the chamber 208 and communicating with the top of balancing chamber B1 is located an intake duct 216. A return duct 218 communicates with the balancing chamber B1 near its bottom to return the air to the temperature and humidity control box 200. The intake and exhaust ducts 216, 218 are each provided with manually controlled damper valves 220, 222, respectively. Thus, by opening both of the valves 220 and 222 the balancing chamber B1 will have the same temperature and humidity control as the proofing chamber. In like manner, the balancing chamber B2 is provided with an intake duct 224 and exhaust duct 226 provided, respectively, with damper valves 228, 230.

Thus, the balancing chamber's temperature and humidity may be selectively set to correspond to that of the proofing chamber or the baking chamber.

I do not wish to be limited to the embodiment herein described, but, as my invention, I assert the elements and combinations recited in the appended claims.

I claim:

1. An automatic bread plant comprising, a baking chamber, a proofing chamber, an endless conveyor running through said two chambers, an intermediate chamber positioned about said continuous conveyor and between said first two mentioned chambers, a combustion chamber located adjacent said baking chamber, an intake header positioned in said first-named chamber and communicating with said combustion chamber, radiating flues communicating with said intake header and positioned in said intermediate chamber, a pipe connecting said intake header of said baking chamber with said radiating flues of said intermediate chamber, and damper means in said pipe to selectively close or open said pipe whereby said intermediate chamber may be used as a baking chamber.

2. In a composite automatic bread plant having in combination at least four heat-insulated chambers, an endless chain conveyor having its upper pass passing consecutively through said four chambers, said upper pass of said continuous conveyor making at least two passes through each of said four chambers, a return cooling chamber located beneath said four chambers and receiving therethrough the lower or return pass of said endless conveyor, trays pivotally secured to said conveyor, said trays being adaptable to support a strap of bread pans, means to heat the first of said four chambers to proofing temperature, and other heat means to heat the last of said chambers to baking temperature, selective heat means in the two intermediate chambers to selectively heat each of said chambers to proofing or baking temperature, a loading platform at said first chamber, said trays on said conveyor having a plurality of fingers to support a strap of pans, said loading platform in said first chamber being composed of a plurality of fingers positioned to interfinger with the fingers of said trays, said loading platform being located adjacent a vertical and upwardly moving pass of said conveyor so that the fingers of said trays will remove therefrom a pan strap placed thereon, a tipping arm connected at its one end to each of said trays, said tipping arm having a free end and a cam roller mounted thereon, a cam positioned adjacent the exit of said fourth chamber to engage said cam roller to tip said tray more than 90 degrees, stationary fingers positioned to engage said pan strap to prevent its falling from said tipped tray, said stationary fingers being spaced apart sufficiently to permit bread loaves from said pans to pass therebetween thus to be discharged from said tray, said cam means then permitting said tray with said pan strap to return to approximately the horizontal, further cam means located adjacent the end of said return cooling chamber to again engage said cam roller to tip said trays sufficiently to permit said pan straps to be discharged therefrom, and a second continuous conveyor positioned beneath said last-named tipping means to receive said strap, said secondary endless conveyor running to a pan greasing means, thence past depositing nozzles to said loading platform whereby the cycle may repeat.

3. In a composite automatic bread plant having in combination heat-insulated chambers, an endless chain conveyor having its upper pass passing consecutively through said chambers, a return cooling chamber located beneath said chambers and receiving therethrough the lower or return pass of said endless conveyor, trays pivotally secured to said conveyor, said trays being adaptable to support a strap of bread pans, means to heat the first of said chambers to proofing temperature, and other heat means to heat the last of said chambers to baking temperature, selective heat means in the intermediate chambers to selectively heat each of said chambers to proofing or baking temperature, a loading platform at said first chamber, said trays on said conveyor having a plurality of fingers to support a strap of pans, said loading platform in said first chamber being composed of a plurality of fingers positioned to interfinger with the fingers of said trays, said loading platform being located adjacent a vertical and upwardly moving pass of said conveyor so that the fingers of said trays will remove therefrom a pan strap placed thereon, a tipping arm connected to each of said trays, said tipping arm having a free end, a cam roller connected to the free end of said tipping arm, a cam positioned adjacent the exit of said last chamber to engage said cam roller to tip said tray more than 90 degrees, stationary fingers positioned to engage said pan strap to prevent its falling from said tipped tray, said stationary fingers being spaced apart sufficiently to permit bread loaves from said pans to pass therebetween thus to be discharged from said tray, said cam means then permitting said tray with said pan strap to return to approximately the horizontal, further cam means located adjacent the end of said return cooling chamber to again engage said cam roller to tip said trays sufficiently to permit said pan straps to be discharged therefrom, a second continuous conveyor positioned beneath said last-named tipping means to receive said straps, said secondary endless conveyor running to a pan greasing means, thence past depositing nozzles to said loading platform whereby the cycle may repeat.

4. In a composite automatic bread plant having in combination heat-insulated chambers, an endless chain conveyor having its upper pass passing consecutively through said chambers, a return cooling chamber located beneath said chambers and receiving therethrough the lower or return pass of said endless conveyor, trays pivotally secured to said conveyor, said trays being adaptable to support a strap of bread pans, means to heat the first of said chambers to proofing temperature, and other heat means to heat the last of said chambers to baking temperature, selective heat means in the intermediate chambers to selectively heat each of said chambers to proofing or baking temperature, a loading platform at said first chamber, said trays on said conveyor having a plurality of fingers to support a strap of pans, said loading platform in said first chamber being composed of a plurality of fingers positioned to interfinger with the fingers of said trays, said loading platform being located adjacent a vertical and upwardly moving pass of said conveyor so that the fingers of said trays will remove therefrom a pan strap placed thereon, a tipping arm connected to each of said trays, said tipping arm having a free end, a cam roller connected to the free end of said tipping arm, a cam positioned adjacent the exit of said last chamber to engage said cam roller to tip said tray more than 90 degrees, stationary fingers positioned to engage said pan strap to prevent its falling from said tipped tray, said stationary fingers being spaced apart sufficiently to permit bread loaves from said pans to pass therebetween thus to be discharged from said tray, said cam means then permitting said tray with said pan strap to return to approximately the horizontal, further cam means located adjacent the end of said return cooling chamber to again engage said cam roller to tip said trays sufficiently to permit said pan straps to be discharged therefrom, a second continuous conveyor positioned beneath said last-named tipping means to receive said straps, said secondary endless conveyor running to a pan greasing means, a third endless conveyor running therefrom to said loading platform, dough depositing means including nozzles located adjacent said loading platform, and trip means activated by said pans at said loading platform to operate said dough depositing means to deposit dough in said pans at said loading platform.

5. In a composite automatic bread plant having in combination heat-insulated chambers, an endless chain conveyor having its upper pass passing consecutively through said chamber, a return cooling chamber located beneath said chambers and receiving therethrough the lower or return pass of said endless conveyor, trays pivotally secured to said conveyor, said trays being adaptable to support a strap of bread pans, means to heat the first of said chambers to proofing temperature, and other heat means to heat the last of said chambers to baking temperature, selective heat means in the intermediate chambers to selectively heat each of said chambers to proofing or baking temperature, a loading platform at said first chamber, said trays on said conveyor having a plurality of fingers to support a strap of pans, said loading platform in said first chamber being composed of a plurality of fingers positioned to interfinger with the fingers of said trays, said loading platform being located adjacent a vertical and upwardly moving pass of said conveyor so that the fingers of said trays will remove therefrom a pan strap placed thereon, a tipping arm connected to each of said trays, said tipping arm having a free end, a cam roller connected to the free end of said tipping arm, a cam positioned adjacent the exit of said last chamber to engage said cam roller to tip said tray more than 90 degrees, stationary fingers positioned to engage said pan strap to prevent its falling from said tipped trays, said stationary fingers being spaced apart sufficiently to permit bread loaves from said pans to pass therebetween thus to be discharged from said trays, said cam means then permitting said tray with said pan strap to return to approximately the horizontal, further cam means located adjacent the end of said return cooling chamber to again engage said cam roller to tip said trays sufficiently to permit said pan straps to be discharged therefrom.

6. In a bread baking oven having a continuous conveyor belt for transporting straps of bread-baking pans therethrough, said conveyor comprising a pair of endless chains moving in parallel planes, trays pivotally secured to and between said chains, said trays comprising a transverse member secured in pivotal mounting to said endless chains, horizontal arms adjustably mounted to said transverse member at right angles thereto, said arms being adjustable away from and toward each other to support a strap of pans, an arm mounted on said transverse member, a cam roller associated with said arm, a pair of sprockets supporting a section of said endless chain conveyor, spaced stationary depanner arms located adjacent and between said sprockets, a cam track adapted to engage said cam roller at a point adjacent said sprocket and so constructed and arranged that said tray arms will be rotated upward more than 90 degrees about the axis of said transverse member, means to secure the edge of said pan strap adjacent said transverse member to said horizontal arms whereby said pan strap will fall so that the free and upward edge thereof will swing in an arc about said securing means to strike said stationary depanner arms, said stationary arms being positioned in the same vertical planes as the horizontal arms of said tray whereby loaves of bread will be jarred from the pans of said pan strap and fall free, said cam means then re-righting said tray and said stationary fingers being so constructed and arranged so as to engage the upward end of said pan strap to cause it to tilt back again on said tray as said tray with said conveyor moves down about said sprocket.

7. A combination depanning and pan discharging mechanism comprising an endless conveyor formed of a pair of endless spaced parallel chains, pan supporting trays pivotally mounted on said conveyor between said chains, said trays having a shaft transverse said conveyor, spaced parallel fingers positioned in the same plane to support said pans and mounted on said shaft, a tray stabilizing arm mounted to rotate said shaft, a cam follower associated with said arm, a cam operatively mounted adjacent a pulley over which said conveyor passes, said cam co-acting with said cam follower to swing said arm to rotate said shaft to swing said fingers upwardly more than 90 degrees to tip any pans supported thereon, pan engaging means located on said fingers adjacent said shaft to engage and hold the adjacent end of said pan when said fingers are raised beyond the vertical, stationary fingers located adjacent said pulley to engage the free end of said pans when said pans are held at the other end by said pan engaging means to catch said free end to jar said pans whereby the contents thereof may fall between said stationary fingers, said cam and said cam follower then rotating said shaft to return said fingers to the horizontal, said stationary fingers being of sufficient length to return said pans with said tray fingers as said tray supporting means moves about said pulley, and further cam means to engage said cam follower of said stabilizing arm to rotate said shaft in the opposite direction to lower said tray supporting fingers to discharge said pan away from said pan engaging means located adjacent the hub of said fingers.

8. At the discharge end of an oven, depanning means comprising an endless conveyor formed of a pair of endless spaced parallel chains, pan supporting trays pivotally mounted on said conveyor between said chains, said trays having a shaft transverse said conveyor, spaced parallel fingers positioned in the same plane to support said pans and mounted on said shaft, a tray stabilizing arm mounted to rotate said shaft, a cam follower associated with said arm, a cam operatively mounted adjacent a pulley over which said conveyor passes, said cam co-acting with said cam follower to rotate said shaft to swing said fingers upwardly more than 90 degrees to tip any pans supported thereon, pan engaging means located on said fingers adjacent said shaft to prevent said pan from falling therefrom when said fingers are raised beyond the vertical, stationary fingers located adjacent said pulley to engage the free end of said pans when said pans are held at the other end by said pan engaging means to catch said free end to jar said pans whereby any contents therein may fall between said stationary fingers, said cam engaging means then rotating said shaft to return said fingers to the horizontal, said stationary fingers being of sufficient length to return said pans with said tray fingers as said tray supporting means moves about said pulley.

9. Depanning means in a baking oven, a pair of spaced conveyor chains, pulleys mounting said chains, a transverse shaft pivotally mounted to and between said chains, tray supporting arms having a hub secured to said shaft, a plurality of pans, means securing said plurality in a unitary group, at least two of said arms being positioned to engage said securing means of said plurality of pans, a cam member located adjacent said chains where said chains pass over the top of a pulley and down, means on said arm-supporting shaft to engage said cam member to rotate said shaft more than 90 degrees in the same direction that said pulley rotates to dump said pans, spaced depanning arms angularly positioned beyond and adjacent said pulley to receive said dumped pans, said depanner arms being spaced to contact said pan securing means whereby any contents of said pans may pass between said depanner arms, said cam means then rotating said shaft to return said arms to their initial horizontal position and said spaced depanner arms returning said pans with said arms as said shaft moves about said pulley on said chains.

10. Depanning means in a baking oven, a pair of spaced conveyor chains, pulleys mounting said chains, a transverse shaft pivotally mounted to and between said chains, tray supporting arms having a hub mounted on said shaft, said arms being slidably adjustable along said shaft and keyed thereto against rotation thereabout, a plurality of pans, means securing said plurality in a unitary group, at least two of said arms being positioned to engage said securing means of said plurality of pans, a cam member located adjacent said chains where said chains pass over the top of a pulley and down, means on said arm-supporting shaft to engage said cam member to rotate said shaft more than 90 degrees in the same direction that said pulley rotates to dump said pans, spaced depanning arms angularly positioned beyond and adjacent said pulley to receive said dumped pans, said depanner arms being spaced to contact said pan securing means whereby any contents of said pans may pass between said depanner arms, said cam means then rotating said shaft to return said arms to their initial horizontal position and said spaced depanner arms returning said pans with said arms as said shaft moves about said pulley on said chains.

11. Depanning means in a baking oven, a pair of spaced conveyor chains, pulleys mounting said chains, a transverse shaft pivotally mounted to and between said chains, tray supporting arms having a hub secured to said shaft, a plurality of pans, means securing said plurality in a unitary group, at least two of said arms being positioned to engage said securing means of said plurality of pans, a lug on the hub of said arms positioned to engage said pan securing means, a cam member located adjacent said chains where said chains pass over the top of a pulley and down, means on said arm-supporting shaft to engage said cam member to rotate said shaft more than 90 degrees in the same direction that said pulley rotates to dump said pans, spaced depanning arms angularly positioned beyond and adjacent said pulley to receive said dumped pans, said depanner arms being spaced to contact said pan securing means at one end of said pans, the other end of said pans contacting said lug, whereby any contents of said pans may pass between said depanner arms, said cam means then rotating said shaft to return said arms to their initial horizontal position and said spaced depanner arms returning said pans with said arms as said shaft moves about said pulley on said chains.

12. Depanning means in a baking oven, a pair of spaced conveyor chains, pulleys mounting said chains, a transverse shaft pivotally mounted to and between said chains, tray supporting arms having a hub mounted on said shaft, said arms being slidably adjustable along said shaft and keyed thereto against rotation thereabout, a plurality of pans, means securing said plurality in a unitary group, at least two of said arms being positioned to engage said securing means of said plurality of pans, a lug on the hub of said arms positioned to engage said pan securing means, a cam member located adjacent said chains where said chains pass over the top of a pulley and down, means on said arm-supporting shaft to engage said cam member to rotate said shaft more than 90 degrees in the same direction that said pulley rotates to dump said pans, spaced depanning arms angularly positioned beyond and adjacent said pulley to receive said dumped pans, said depanner arms being spaced to contact said pan securing means at one end of said pans, the other end of said pans contacting said lug whereby any contents of said pans may pass between said depanner arms, said cam means then rotating said shaft to return said arms to their initial horizontal position and said spaced depanner arms returning said pans with said arms as said shaft moves about said pulley on said chains.

13. In a composite unit having a proofer chamber, an oven chamber, a pan cooling chamber, and pan greasing chamber, a conveyor comprising a pair of spaced endless chains running through said proofing chamber and said oven chamber and said pan cooling chamber, pulleys mounting said chains, the said chains making more than one pass in each of the said first two named chambers, pan supporting trays pivotally mounted to and between said pair of chains, a depanning station located in sequence after said oven and before said cooling chamber, means in said depanning station to tilt said trays beyond the vertical to dump therefrom the contents of said trays, a pan unloading station located adjacent the end of said pan cooling chamber, mechanism thereat for removing said pans from said trays, a second conveyor to transport said dumped pans from said last-named station to said greasing chamber, a pan loading and depositing station located adjacent said proofing chamber, pan conveyor means extending from said greasing station to said pan loading and depositing station, mechanism for depositing bread dough into said pans at said station, trip means operated by said pans to activate said mechanism, and further means operated from said trip means to load said pans onto said trays as they enter said proofer on said conveyor chains.

14. A composite automatic bread plant having in combination heat-insulated chambers, an endless chain conveyor having its upper pass passing consecutively through said chambers, a return cooling chamber located beneath said chambers and receiving therethrough the lower or return pass of said endless conveyor, trays pivotally secured to said conveyor, said trays being adaptable to support a strap of bread pans, means to heat the first of said chambers to proofing temperature and humidity, and other heat means to heat the last of said chambers to baking temperature and humidity, selective heat means in the intermediate chambers to selectively heat each of said chambers to proofing or baking temperature and humidity, a loading platform at said first chamber, said trays on said conveyor having a plurality of fingers to support a strap of pans, said loading platform in said first chamber being composed of a plurality of fingers positioned to interfinger with the fingers of said trays, said loading platform being located adjacent a vertical and upwardly moving pass of said conveyor so that the fingers of said trays will remove therefrom a pan strap placed thereon, a tipping arm connected to each of said trays, said tipping arm having a free end, a cam roller connected to the free end of said tipping arm, a cam positioned adjacent the exit of said last chamber to engage said cam roller to tip said tray more than 90 degrees, stationary fingers positioned to engage said pan strap to prevent its falling from said tipped tray, said stationary fingers being spaced apart sufficiently to permit bread loaves from said pans to pass therebetween thus to be discharged from said tray, said cam means then permitting said tray with said pan strap to return to approximately the horizontal, further cam means located adjacent the end of said return cooling chamber to again engage said cam roller to tip said trays sufficiently to permit said pan straps to be discharged therefrom, a second continuous conveyor positioned beneath said last-named tipping means to receive said straps, said secondary endless conveyor running to a pan greasing means, then past depositing nozzles to said loading platform whereby the cycle may repeat.

15. The combination claimed in claim 1, further characterized by vent means in said intermediate chamber selectively operable to vent said intermediate chamber whereby its temperature may be selectively reduced substantially to that of room temperature when the damper means in said pipe is closed.

16. An automatic bread plant comprising, a baking chamber, a proofing chamber, an endless conveyor running through said two chambers, an intermediate chamber positioned about said continuous conveyor and between said first two mentioned chambers, a temperature and humidity control box, a large conduit communicating between said box and said proofing chamber, a small conduit communicating between said box and said intermediate chamber, means to force air from said temperature control box through said conduits, damper means in said small conduit to selectively open said small conduit, whereby the temperature and humidity in said intermediate chamber may be selectively maintained the same as the temperature and humidity in said proofing chamber.

17. The combination claimed in claim 16, further characterized by a vent in said intermediate chamber selectively movable from a closed to an open position to communicate said intermediate chamber with the exterior atmosphere when said vent is moved to said open position whereby the temperature and humidity of said intermediate chamber may be selectively reduced substantially to that of the exterior atmosphere when said damper means in said small conduit is in closed position.

18. In a composite automatic bread plant having a proofing chamber, a baking chamber and an intermediate balancing chamber, an endless chain conveyor having pan supporting trays passing consecutively through said chambers, means to discharge pans from said pan supporting trays, a secondary conveyor positioned to receive pans discharged from said main conveyor, said secondary conveyor having pan greasing and pan filling devices therealong, a loading platform adjacent said secondary conveyor to receive pans therefrom, and a pusher bar operative to push a pan from said secondary conveyor to said loading platform, said pusher bar being operatively controlled by means activated in timed relation to the passage of said trays through said loading platform.

19. A mechanism suitable for use in an automatic bread plant comprising, a pan supporting tray adapted to be pivotally supported on pivots transverse to the direction they may be moved, lugs at the forward end of said tray positioned to engage one end of a strap of pans to prevent its slipping from said tray when said tray is tilted from the horizontal, means to tilt said tray more than 90 degrees from the horizontal, stationary fingers positioned to engage the other end of said strap of pans distant from said lugs of said tray to catch said other end as it falls in an arc from said tray when it has been displaced more than 90 degrees from the horizontal to jar free the contents of said pans, said fingers being further shaped to guide said pans back against said tray as it returns to the horizontal.

20. A mechanism in combination with an endless conveyor comprising a pair of spaced parallel endless chains, said conveyor making a pass of about 180 degrees around a supporting sprocket, a pan supporting tray pivotally suspended between said chains of said conveyor, lugs at the forward end of said tray positioned to engage one end of a strap of pans supported on said tray to prevent its slipping from said tray when said tray is tilted from the horizontal in one direction, means located adjacent a downward pass of said conveyor around said sprocket to tilt said tray more than 90 degrees from tthe horizontal, stationary fingers positioned to engage the other end of said strap of pans distant from said lugs of said tray to catch said other end as it falls in an arc from said tray when said tray has been displaced more than 90 degrees from the horizontal to jar free the contents of said pans, said fingers further extending toward the bottom of said sprocket to maintain engagement with said other end of said pan as it moves with said tray around said sprocket to guide said other end back upon said tray as said tray returns to the horizontal upon passing around said sprocket.

21. An endless conveyor comprising, a pair of spaced parallel chains, a tray pivotally mounted between said chains to support bake pans placed thereon, means to engage said tray during its travel with said conveyor to rotate said tray more than 90 degrees, and a lug to engage one edge of a pan on said tray when it is so rotated to hold one end of a pan on said tray while the opposite end moves free under the force of gravity, and a cam-like bar to engage and arrest the free moving end of a pan and then guide said free end back onto said tray as said tray returns to level position during its travel with said endless conveyor.

22. A conveyor comprising a pair of spaced parallel chains, a tray supported between said chains, said tray having a transverse shaft, tray supporting fingers mounted on said shaft, a lug on said tray adjacent said shaft to engage one end of a pan supported on said fingers, support arms secured to and supporting at their one end an end of said transverse shaft, the other end of each of said arms being pivotally mounted in each of said spaced parallel chains respectively, a cam engaging member on said transverse shaft of said tray, a stationary cam mounted adjacent said conveyor to engage said member to rotate said tray in one direction so that a pan supported thereon engages said lug with its one end, its other end falling free of the tray, a stationary cam-like bar mounted to arrest the free falling other end of a pan to jar its contents loose and to move it back against said tray as said tray travels with said conveyor, and a second stationary cam to engage said cam engaging member on said transverse shaft to rotate said tray in the opposite direction to discharge a pan thereon away from said pan arresting lug.

23. A mechanism suitable for use in an automatic bread plant comprising, a pan supporting tray adapted to be pivotally supported on pivots transverse to the direction they may be moved, lugs at the forward end of said tray positioned to engage one end of a strap of pans to prevent its slipping from said tray when said tray is tilted from the horizontal, means to tilt said tray more than 90 degrees from the horizontal, and stationary fingers positioned to engage the other end of said strap of pans distant from said lugs of said tray to catch said other end as it falls in an arc from said tray when it has been displaced more than 90 degrees from the horizontal to jar free the contents of said pans.

References Cited in the file of this patent

UNITED STATES PATENTS

| Number | Name | Date |
| --- | --- | --- |
| 1,086,398 | Renner | Feb. 10, 1914 |
| 1,345,079 | Fisch | June 29, 1920 |
| 1,420,102 | Hilenbrant | June 20, 1922 |
| 1,491,689 | Gantvoort | Apr. 22, 1924 |
| 1,898,653 | Bleier | Feb. 21, 1933 |
| 1,938,294 | Lauterbur et al. | Dec. 5, 1933 |
| 2,445,884 | McManus | July 27, 1948 |